United States Patent [19]
Cioca et al.

[11] 4,380,474
[45] Apr. 19, 1983

[54] POLYISOCYANATE REACTION PRODUCTS

[75] Inventors: Gheorghe Cioca, Coatesville, Pa.;
Paul A. Fertell, Wilmington, N.J.

[73] Assignee: Seton Company, Newark, N.J.

[21] Appl. No.: 317,171

[22] Filed: Nov. 3, 1981

Related U.S. Application Data

[63] Continuation-in-part of Ser. No. 211,636, Dec. 1, 1980, abandoned.

[51] Int. Cl.³ .............................................. C08L 89/06
[52] U.S. Cl. ..................................... 106/155; 8/94.27
[58] Field of Search ....................... 106/155; 252/312; 8/94.27

[56] References Cited

U.S. PATENT DOCUMENTS 2,808,398 10/1957 Forward ............................. 106/155
3,428,592 2/1969 Youker ............................... 252/312
4,060,384 11/1977 Siegler ............................... 8/94.27

Primary Examiner—Theodore Morris
Attorney, Agent, or Firm—Webb, Burden, Robinson & Webb

[57] ABSTRACT

An article of manufacture is comprised of the reaction product of a polyisocyanate and tanned leather scrap. The product is capable of being sawed and nailed in much the same manner and has similar characteristics to particle board.

11 Claims, No Drawings

POLYISOCYANATE REACTION PRODUCTS

CROSS REFERENCE TO RELATED APPLICATIONS

This application is a continuation-in-part of U.S. application Ser. No. 211,636, filed Dec. 1, 1980 now abandoned.

BACKGROUND OF THE INVENTION

1. Field of the Invention

This invention relates to polyisocyanate reaction products and, more particularly, to the reaction product of polyisocyanates and tanned leather scrap.

2. Description of the Prior Art

Polyisocyanates are known for their reactivity with a variety of functional groups and have been used in forming coatings, foams, laminates, and other articles of manufacture. The most extensive use of polyisocyanates has been in the formation of polyurethanes which are typically the reaction product of a polyisocyanate and a polyhydroxy compound. Further, it has been known that polyisocyanates, through the isocyanate group, are reactive with carboxyl groups, water, and amine groups to form ureas, biurets and mixed urethanes.

In one particular use of polyisocyanates, such polyisocyanates are reacted with sawdust, wood chips and the like under heat and pressure to form what is known as "particle board" or "chip board". This particle board or chip board has found extensive utility in the construction and furniture industry since in many instances its physical properties are similar to that of expensive hard woods and when finished in the appropriate manner have comparable aesthetic properties. Further, this particle board or chip board is structurally sound and is useful in a broad range of applications.

Another advantage of a particle board or chip board is that the cost of manufacture and raw materials is substantially less than that of board stock. The diminishing supply of wood has caused wood to become extremely expensive in comparison with other construction materials. The use of wood chips and/or sawdust which are by-products of the milling process provide material, which is low in cost, and once reacted with polyisocyanates under heat and pressure form desirable products.

One of the deficiencies of chip board and/or particle board is that they readily burn because of the high cellulosic content and in order to impart fire retardant characteristics to the chip board or particle board, it is necessary to incorporate fire retardant additives therein. These fire retardant additives are typically halogen and phosphorus containing materials and may also contain antimony and a variety of other speciality chemicals which increase the cost of the particle board or chip board thus making such material undesirable.

The industry has long pursued production of a product which is low in cost yet has the integrity and workability of chip board or particle board or wood and which has fire retardant characteristics while maintaining a lot cost of production.

In accordance with the present invention, an article of manufacture is provided which is comparable in integrity, workability and economic advantage while providing the added advantage of inherent fire retardancy.

BRIEF DESCRIPTION OF THE INVENTION

An article of manufacture is comprised of the reaction product of a polyisocyanate and tanned leather scrap. The product is capable of being sawed and nailed in much the same manner and having similar characteristics to particle board.

DETAILED DESCRIPTION OF THE INVENTION

"Tanned leather scrap" as used herein means and refers to by-products of leather production and are the shavings and trimmings of tanned leather produced in order to manufacture a leather product. Typically, tanned leather scrap has a variety of dimensions and is typically anywhere from powdery particulates to thin small flexible sheets having a thickness of about 1 to 30 mils. The tanned leather scrap, and more particularly chrome shavings, as produced normally contains a large amount of water, i.e. about 50 percent. Therefore, it may be desirable to dry the tanned leather scrap to a predetermined moisture content since isocyanates are known to react with water to form ureas. Thus, in order to provide a consistent product, it is desirable to provide tanned leather scrap in the practice of the invention which has a uniform moisture content. Most preferably, it is desirable to dry the tanned leather scrap to its equilibrium state wherein it contains about 6 to 12 percent by weight water, although it may be dried to lower moisture levels. Upon exposure to the atmosphere, tanned leather scrap will equilibrate to a water content of 6 to 12 percent. The most preferred tanned leather scrap is chrome shavings which are shavings and trimmings from leather produced in the chrome tanning process. The chrome shavings are generated after a hide has been treated with a chrome containing chemical which prevents the hide from putrefying. The chrome treated hide is shaved to provide the desired thickness. The shavings are thus referred to as chrome shavings. These chrome shavings differ from leather scrap generated further on in the leather production. Chrome shavings are hydrophilic in nature, whereas other leather scrap contains fats, finishing chemicals and similar materials which impart hydrophobic qualities to the final product.

Although it is not fully understood, it is known that tanned leather scrap which is, in fact, treated collagen, possesses various pendant functional groups along the polypeptide chains. These functional groups include hydroxyl, carboxyl, thio, amine and the like. While it is known that these functional groups, per se, are reactive with isocyanates, it is believed that the functional groups in the tanned leather scrap react with the isocyanate to a certain extent, although not all functional groups in the tanned leather scrap may be reactive due to the possible stearic hinderance of the polypeptide chains preventing reaction with the isocyanate. Likewise, it is not known whether the water of equilibrium present in tanned leather scrap reacts with the isocyanate or if it is sufficiently bound within the protein structure to make it unavailable for reaction with the isocyanate. In any event, excess water forming polyureas with reactive polyisocyanates are not necessarily undesirable in that they do, in fact, build molecular weight and so long as some functional groups in the polypeptide chain react with isocyanate groups in the polyisocyanate, structural integrity of the final product can be accomplished. The polyisocyanate acts as a binder for the chrome shavings.

The polyisocyanates useful in the practice of the invention are those polyisocyanates having at least two isocyanate groups thereon and more preferably three or greater isocyanate groups per molecule. Typical diisocyanates useful in forming the reaction product of the invention are toluene diisocyanate, meta-phenylene diisocyanate; biphenylene 4-4'-diisocyanate; methylene-bis (4-phenyl isocyanate); 4-chloro-1,3 phenylene diisocyanates; naphthylene-1, 5-diisocyanate; tetramethylene-1, 4-diisocyanate; hexamethylene-1, 6-diisocyanate; decamethylene-1, 10-diisocyanate; cyclohexylene-1, 4-diisocyanate; methylene-bis (4-cyclohexyl isocyanate); tetrahydronaphthylene diisocyanate; isophorone diisocyanate and the like. Polyisocyanates within the scope of the invention having three or more functional groups can be formed by the reaction of the above diisocyanates with polyhydroxy compounds having greater than two functional hydroxyl groups per molecule at a stoichiometry of one mole of diisocyanate per equivalent of hydroxy group thereby reacting all of the hydroxy groups along the chain of the polyhydroxy compound and providing an equal number of free isocyanate groups thus forming a polyisocyanate compound. In like manner, polyamines, polycarboxyl groups, polythio compounds and polycarboxyl compounds and the like can be reacted in much the same manner with diisocyanates or other polyisocyanates to provide a highly functional polyisocyanate compound.

The most particularly preferred polyisocyanates are the polymeric isocyanates which are dimers, trimers, and oligomers of the diisocyanate and most preferably the aromatic diisocyanates. These polymeric isocyanates can be used, per se, or blended with diisocyanates at desirable levels.

When chrome shavings are used as the leather scrap, a water dispersible or water soluble polyisocyanate is preferred in order to penetrate the collagen structure.

In accordance with the present invention, the tanned leather scrap in the composition is present at a level of 50 to 99 percent by weight and more preferably at a level of 80 to 99 percent by weight based upon the total weight of the article. The polyisocyanate component is present at a level of 1 to 50 and more preferably 1 to 20 percent by weight based upon the total weight of the article.

In addition to the tanned leather scrap and the polyisocyanate, additional materials may be used in order to form the articles. For example, catalysts such as the tin catalysts and amine catalysts may be used to promote the reaction of the polyreactive hydrogen compound, and the reaction of the polyisocyanate and the tanned leather scrap. Typical tin catalysts are stannous octoate and dibutyltin dilaurate. The amine catalysts are well known to those skilled in the art. Further, sawdust, wood chips and the like may also be added if desired but are not necessary in forming articles in accordance with the invention.

In forming the articles in accordance with the present invention, the polyisocyanate is admixed with the tanned leather scrap to form a mixture which is as homogeneous as possible depending upon the physical form of the tanned leather scrap. For example, when powdered tanned leather scrap is used, a highly homogeneous mixture can be formed. However, when sheets of tanned leather scrap and other such large forms of tanned leather scrap are used, a true homogeneous mixture is difficult to achieve.

After the materials are mixed, they are placed in a press and heated at the temperature necessary to cure the composite. Sufficient pressure is imparted in order to expel air therefrom and sufficient heat to react the isocyanate with the tanned leather scrap. Less heat may be required if a catalyst is used. Typically, the materials are pressed for curing at a level of 500 to 3000 psi and more preferably, 500 to 2500 psi. The higher the pressure applied, the denser the final article. Thus, when pressures over 750 psi are used, the article gains integrity and strength. The temperature range useful in the practice of the invention is anywhere from room temperature when a catalyst is used up to about 200° C. or the degradation point of the tanned leather scrap and the polyisocyanate. Preferably, the temperature range used in curing is about 70° to 170° C.

The articles so formed are capable of nailing, sawing and other such actions as is necessary to provide a construction material comparable to particle board or chip board. In addition, it has been found that the articles manufactured in accordance with the invention are fire retardant and also self-extinguishing.

Additionally, when chrome shavings are used as the tanned leather scrap, the article is resistant to fungal bacterial decomposition and other types of rotting. Further, the chrome shavings are poisonous when ingested, thus acting as an insecticide or rodenticide when the articles are used as construction materials.

The invention can be further understood with reference to the following examples.

EXAMPLE 1

Seventy parts by weight of chrome shavings were admixed, until homogeneous, with 30 parts by weight of polymethylene polyphenyl isocyanate having 31.5 percent NCO content and an equivalent weight of 132 and sold by Mobay Chemical Corporation under the trade name Mondur ® MRS. The composite was compressed at 6 lbs./sq. inch and cured at 110° C. for one hour. After curing and allowing to cool to room temperature, a 3/32 inch diameter nail was driven through the article which was rigid and the article demonstrated nail holding power. Contact with the flame at 2200° F. charred the material, but it did not smoke or burn nor maintain after glow when the flame was removed.

EXAMPLE 2

Sixty-four parts of chrome shavings were admixed with 34.5 parts of a 50:50 solution of polymethylene polyphenylene diisocyanate: 4,4' diphenylmethane diisocyanate. The admixture was molded under a pressure of 6 psi and cured at 70° to 80° C. for one hour. The resulting article was rigid and had good strength.

EXAMPLE 3

Chrome shavings which had been dried to a moisture content of 10 percent by weight were hammermilled and screened to provide chrome shavings having a particle size range of −4 to 100 mesh. 92 parts by weight of the chrome shavings were placed in a rotary drum blender and 8 parts by weight of water emulsifiable diphenylmethane diisocyanate having a percent NCO of 29.2–30.2 and emulsified in water to make it sprayable. The isocyanate emulsion was sprayed on the chrome shavings while the blender was rotated. The blender was rotated until a homogeneous admixture of the chrome shavings and isocyanate was produced. 1858 grams of the blended material on a dry solids basis was formed into a rectangular sheet in a mold. The homogeneous blended material was pressed using stops at 300° F. for: 60 seconds at 750 psi; 4.5 minutes at 250 psi; and 30 seconds at 0 psi. The board having dimensions of ½ inch×18 inches×18 inches was removed from the press and allowed to cool. The board so produced was capable of nailing and sawing and was fire retardant.

The boards produced in accordance with the invention can be used as construction material in the same manner as particle board. Also they can be used for thermal and acoustical insulation.

Although the invention has been described with reference to specific components, the invention is only to be limited so far as is set forth in the accompanying claims.

We claim:

1. An article of manufacture comprising: a homogeneous admixture of chrome shavings and a polyisocyanate binder formed into a sheet.

2. The article of claim 1 wherein said polyisocyanate has a functionality of greater than two.

3. The article of claim 1 wherein said polyisocyanate is comprised of 4, 4' diphenylmethane diisocyanate.

4. The article of claim 1 wherein said chrome shavings have a water content of 6 to 12 percent by weight.

5. The article of claim 1 wherein said chrome shavings are present at a level of 50 to 99 parts by weight.

6. The article of claim 5 wherein said chrome shavings are present at a level of 80 to 99 parts by weight.

7. The article of claim 1 wherein said polyisocyanate is present at a level of 1 to 50 parts by weight.

8. The article of claim 6 wherein said polyisocyanate is present at a level of 1 to 20 parts by weight.

9. The article of claim 1 which is capable of being nailed and sawed.

10. The article of claim 1 wherein said reaction product is formed under heat and pressure.

11. An article of manufacture comprising the homogeneous admixture of chrome shavings and a binder formed into a sheet under heat and pressure.

* * * * *